March 27, 1934.   T. FECKER   1,952,062
ELECTRIC VALVE CONVERTING SYSTEM
Filed June 9, 1933
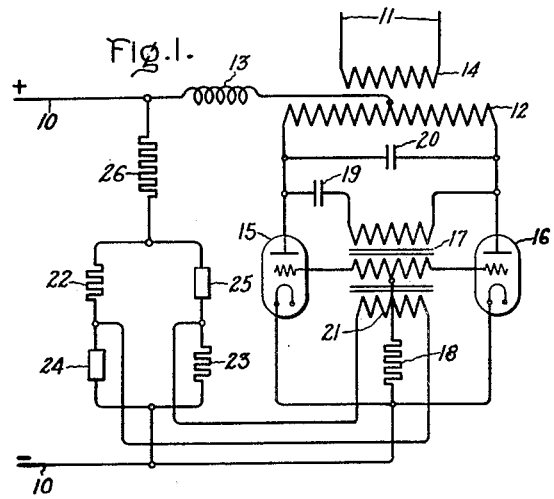
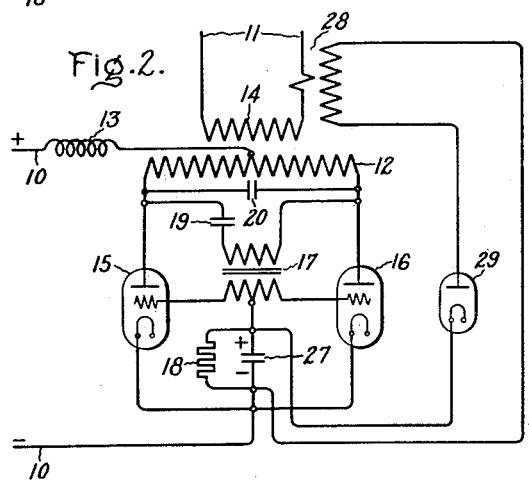
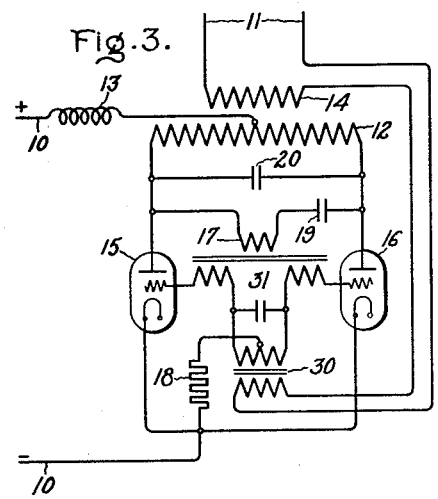
Inventor:
Theodor Fecker.
by Charles E. Mulla
His Attorney.

Patented Mar. 27, 1934

1,952,062

UNITED STATES PATENT OFFICE 1,952,062

ELECTRIC VALVE CONVERTING SYSTEM

Theodor Fecker, Berlin-Reinickendorf-Ost, Germany, assignor to General Electric Company, a corporation of New York Application June 9, 1933, Serial No. 675,058
In Germany August 5, 1932

11 Claims. (Cl. 175—363)

My invention relates to electric valve converting systems and more particularly to such systems suitable for transmitting energy from a direct current supply circuit to an independent alternating current load circuit.

There have been developed several types of electric valve converting apparatus for transmitting energy from a direct current supply circuit to an alternating current load circuit. These apparatus have become to be known in the art as electric valve inverters. It is well known by those skilled in the art that the output voltage of such apparatus varies within wide limits with variations in the load on the apparatus, and that, when such an apparatus is self-excited and connected to supply current to an independent alternating current load circuit, the frequency of the current generated by the apparatus also varies to a certain extent. By the term "independent alterating current circuit" is meant an alternating current circuit which is not connected to a separate source of electromotive force, such as a synchronous generator, for determining its frequency. It is also understood that the output voltage of such an inverting apparatus varies directly with variations in the voltage of the direct current supply circuit and also with variations in the frequency of the current generated by the apparatus. In many cases, however, it is desirable that the output voltage of such an inverting apparatus should be maintained substantially constant or should have a predetermined regulation characteristic. In cases where frequency variation is permissible, such regulation may be effected by varying the frequency of the generated current.

It is an object of my invention, therefore, to provide a new and improved electric valve inverting apparatus for transmitting energy from a direct current supply circuit to an independent alternating current load circuit by means of which a predetermined voltage regulation characteristic will be maintained on the alternating current circuit.

It is another object of my invention to provide an improved electric valve converting system for transmitting energy from a direct current supply circuit to an independent alternating current load circuit in which the voltage on the alternating current load circuit may be maintained substantially constant.

It is a further object of my invention to provide an improved electric valve converting system for transmitting energy from a direct current supply circuit to an independent alternating current load circuit in which the frequency of the current generated by the apparatus is controlled in response to an electrical condition of the system to maintain a predetermined voltage regulation characteristic.

In accordance with my invention the frequency of the alternating current generated by an electric valve inverting apparatus is controlled in response to an electrical condition of the supply or load circuits of the apparatus to maintain a predetermined voltage regulation characteristic on the load circuit; for example, to maintain the voltage on the load circuit substantially constant. The frequency control may be effected in response to any of several operating conditions of the system; for example, to the direct current supply voltage by means of a voltage responsive bridge, or to the current transmitted to the load circuit, as for example by means of a current transformer. In the illustrated embodiments of my invention, the control of the frequency of the alternating current generated by a self-excited inverter is effected by modifying the action of the grid excitation circuit of the inverting apparatus, as for example, by controlling the saturation of the grid transformer utilized to excite the grids of the electric valves, or by producing a variable bias, either unidirectional or alternating, in the grid circuits of the electric valves.

For a better understanding of my invention, together with other and further objects thereof, reference is had to the following description taken in connection with the accompanying drawing, and its scope will be pointed out in the appended claims. In the drawing, Fig. 1 illustrates an embodiment of my invention in which the frequency of the current delivered by a self-excited inverting apparatus is controlled in response to variations in the voltage of the direct current supply circuit; Fig. 2 is a modification of that of Fig. 1 in which the control is effected in response to the current delivered to the load circuit, while Fig. 3 represents a modification of Fig. 2 in which the control responsive to the load current is effected by an alternating current bias in the grid circuits of the inverting apparatus.

Referring now more particularly to Fig. 1 of the drawing, there is illustrated an electric valve converting system embodying my invention for transmitting energy from a direct current supply circuit 10 to a single phase alternating current load circuit 11. This system includes a conventional electric valve inverter of the parallel type comprising a transformer provided with a primary winding 12 having an electrical midpoint connected to one side of the direct current circuit 10 through a smoothing reactor 13 and a secondary winding 14 connected to the alternating current load circuit 11. The end terminals of the primary winding 12 are connected to the other side of the direct current circuit through electric valves 15 and 16. Each of the electric valves 15 and 16 is provided with an anode, a cathode and a control grid and may be of any of the several types well known in the art, although I prefer to utilize valves of the vapor or gaseous discharge type.

In order to render the valves 15 and 16 successively conductive and nonconductive, the grids are connected to their common cathode circuit through opposite halves of the secondary winding of a grid transformer 17 and a current limiting resistor 18, while the primary winding of the transformer 17 is energized from the alternating current circuit of the inverting apparatus, as for example, by connecting it across the secondary winding 12 through a phase advancing capacitor 19. A capacitor 20 is preferably connected across the winding 12 to effect the commutation of current between electric valves 15 and 16.

The voltage on the alternating current circuit 11 is maintained substantially constant by providing the grid transformer 17 with a saturating winding 21 energized in accordance with variations in the voltage of the supply circuit 10. For this purpose there is provided a voltage responsive bridge comprising the similar resistance elements 22 and 23 and the resistance elements 24 and 25 having non-linear voltage-resistance characteristics. The elements 22–25, inclusive, are connected in a well known manner and energized from the circuit 10 through a current limiting resistor 26. The output diagonal of the voltage responsive bridge is connected to energize the saturating winding 21 of the grid transformer 17.

The general principles of operation of the above described apparatus will be well understood by those skilled in the art. In brief, if one of the electric valves, for example, the electric valve 15 is initially rendered conductive, current will flow from the upper side of the direct current circuit through the left-hand portion of the winding 12 and electric valve 15 to the other side of the direct current circuit, inducing a half cycle of alternating current in the winding 14. During this interval, the capacitor 20 is charged to a potential substantially twice that of the direct current circuit and when, 180 electrical degrees later, electric valve 16 is rendered conductive, the potential of the capacitor 20 is effective to transfer the current from the valve 15 to the valve 16 so that current now flows through the right-hand portion of the winding 12 inducing a half cycle of opposite polarity in the winding 14.

By tuning the inductance 13, the leakage reactance of the output transformer and the capacitor 20 to substantially the same frequency as the natural frequency of the grid circuit, substantially sinusoidal current will be supplied to the circuit 11 and the capacitor 19 is truly a phase advancing capacitor. A more general case, however, is that in which the constants of the inverting apparatus are not tuned to the operating frequency and in which both the alternating current supplied to the load circuit 11 and the grid excitation of the several electric valves constitute a series of repeated transients. Under these conditions, the charging of the capacitor 19 will lag that of the capacitor 20 due to the impedance of the transformer 17 included in this circuit. When the current is first commutated between the valves 15 and 16 the charging current of the capacitor 19 flowing in the grid transformer 17 produces a negative bias on the grid of the nonconductive electric valve. As the capacitor 19 approaches a condition of complete charge, the charging current and the grid potential decrease, approaching zero. When the grid potential of the nonconductive electric valve has decreased to a value less than the critical potential of this valve, the valve becomes conductive and the current is transferred from the conductive to the nonconductive valve. Obviously, by changing the impedance of the grid transformer the time required for the grid potential to fall to zero or the critical value of the valve, which corresponds to one-half cycle of alternating current, may be readily controlled.

In the system described above, the impedance of the grid transformer 17 is controlled by means of the saturating winding 21 which is energized with the unbalance voltage of the voltage responsive bridge 22—25. For example, if the supply voltage should rise, tending to increase the voltage on the alternating current circuit 11, the voltage responsive bridge would become unbalanced to decrease the saturation of the transformer 17 and increase its impedance. An increase in the impedance of the transformer 17 will increase the time required to charge the capacitor 19, that is, the duration of each half cycle of alternating current, and thus decrease the frequency of the current supplied to the load circuit 11. As is well understood by those skilled in the art, a decrease in the frequency at which the system operates tends to decrease the voltage of the alternating current circuit and thus compensate for the increase of supply voltage. Obviously, upon a decrease in the voltage of the supply circuit 10 a reverse operation will take place.

In the arrangement of Fig. 2, the control of the frequency of the alternating current is effected by means of a biasing element, such as a capacitor 27, connected in parallel with the current limiting resistor 18. This biasing element may be charged to a potential variable in accordance with any electrical condition of the system, such as the voltage, as in the arrangement of Fig. 1, or the current delivered to the load circuit, as illustrated in Fig. 2, in which the capacitor 27 is connected to be charged from a current transformer 28 through a rectifier device 29. If the capacitor 27 is charged with the polarity indicated, the resultant grid potential of each electric valve will be the sum of the instantaneous potential supplied by the grid transformer 17 and that of the bias capacitor 27. In such case, it is only necessary for the instantaneous grid potential supplied by the transformer 17 to decrease negatively to a value substantially equal to that of the bias capacitor in order to render the electric valve conductive; that is, the electric valve is rendered conductive at a much earlier point in the discharge cycle of the capacitor 19 and the frequency of the alternating current supplied to the load circuit 11 is correspondingly increased. For example, if the current drawn by the load circuit 11 increases, which tends to reduce the voltage of the circuit 11 due to the natural regulation characteristics of the system, the positive bias on the capacitor 27 will correspondingly increase to increase the frequency of the alternating current and raise the voltage of the circuit 11 to compensate for the increase in load.

The arrangement of Fig. 3 is similar to that of Fig. 2 with the exception that the bias potential variable in accordance with the load on the apparatus is an alternating bias rather than a unidirectional bias. In this case the bias potential is provided by means of a series transformer 30, the primary winding of which is connected in the alternating current load circuit 11. Opposite portions of the secondary winding of the series transformer 30 are included in the grid circuits of the electric valves 15 and 16, so that the bias potential supplied to the grid of each electric valve will be of the proper polarity. The capacitor 31 serves as a smoothing capacitor. The operation of this system is identical with that of Fig. 2, the only difference being that the unidirectional bias included in a common portion of the grid circuits of the electric valves is replaced by alternating potentials of opposite polarity in the grid circuits of the electric valves.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is,

1. An electric valve converting system comprising a source of direct current, an independent alternating current load circuit, an electric valve inverting apparatus connected to transmit energy from said source to said load circuit, and means for regulating the voltage on said alternating current circuit comprising means responsive to an electrical condition of said system for varying the frequency of the current generated by said apparatus.

2. An electric valve converting system comprising a source of direct current, an independent alternating current load circuit, an electric valve inverting apparatus connected to transmit energy from said source to said load circuit, and means responsive to an electrical condition of said system for varying the frequency of the current generated by said apparatus to maintain substantially constant the voltage on said alternating current circuit.

3. An electric valve converting system comprising a source of direct current, an independent alternating current load circuit, a self-excited electric valve inverting apparatus connected to transmit energy from said source to said load circuit and including a plurality of electric valves, each provided with a control grid, a circuit for exciting said grids from the output of said apparatus, and means for regulating the voltage on said alternating current circuit comprising means responsive to an electrical condition of said system for modifying the action of said grid excitation circuit to vary the frequency of the current generated by said apparatus.

4. An electric valve converting system comprising a source of direct current, an independent alternating current load circuit, a self-excited electric valve inverting apparatus connected to transmit energy from said source to said load circuit and including a plurality of vapor electric valves, each provided with a control grid, and a circuit for exciting said grids from the output of said apparatus, said apparatus generating a current comprising a series of repeated transients, and means for regulating the voltage on said alternating current circuit comprising means responsive to an electrical condition of said system for controlling the point in each cycle at which said excitation circuit renders said valves conductive to vary the frequency of the current generated by said apparatus.

5. An electric valve converting system comprising a source of direct current, an independent alternating current load circuit, an electric valve inverting apparatus connected to transmit energy from said source to said load circuit, and means for regulating the voltage on said alternating current circuit comprising means responsive to the voltage of said source for varying the frequency of the current generated by said apparatus.

6. An electric valve converting system comprising a source of direct current, an independent alternating current load circuit, a self-excited electric valve inverting apparatus connected to transmit energy from said source to said load circuit and including a plurality of electric valves, each provided with a control grid, a grid transformer connected to excite said grids from the output of said apparatus, a saturating winding for said transformer, and means for regulating the voltage on said alternating current circuit comprising means responsive to an electrical condition of said system for energizing said saturating winding to vary the frequency of the current generated by said apparatus.

7. An electric valve converting system comprising a source of direct current, an independent alternating current load circuit, a self-excited electric valve inverting apparatus connected to transmit energy from said source to said load circuit and including a plurality of electric valves, each provided with a control grid, a grid transformer connected to excite said grids from the output of said apparatus, a saturating winding for said transformer, and means for regulating the voltage on said alternating current circuit comprising a voltage responsive bridge connected to said source, and a circuit for energizing said saturating winding with the unbalance voltage of said bridge to vary the frequency of the current generated by said apparatus.

8. An electric valve converting system comprising a source of direct current, and independent alternating current load circuit, an electric valve inverting apparatus connected to transmit energy from said source to said load circuit, and means for regulating the voltage on said alternating current circuit comprising means responsive to the current transmitted to said load circuit for varying the frequency of said current.

9. An electric valve converting system comprising a source of direct current, an independent alternating current load circuit, a self-excited electric valve inverting apparatus connected to transmit energy from said source to said load circuit and including a plurality of electric valves, each provided with a control grid, a circuit for exciting said grids from the output of said apparatus, and means for regulating the voltage on said alternating current circuit comprising means for introducing into said grid circuit a positive bias potential variable in accordance with the current transmitted to said load circuit to vary the frequency of the current generated by said apparatus.

10. An electric valve converting system comprising a source of direct current, an independent alternating current load circuit, a self-excited electric valve inverting apparatus connected to transmit energy from said source to said load circuit and including a plurality of electric valves, each provided with a control grid, a circuit for exciting said grids from the output of said apparatus, and means for regulating the voltage on said alternating current circuit comprising a bias capacitor included in said grid circuit and rectifier means for charging said capacitor in accordance with the current transmitted to said load circuit to vary the frequency of the current generated by said apparatus.

11. An electric valve converting system comprising a source of direct current, an independent alternating current load circuit, a self-excited electric valve inverting apparatus connected to transmit energy from said source to said load circuit and including a plurality of electric valves, each provided with a control grid, a circuit for exciting said grids from the output of said apparatus, and means for regulating the voltage on said alternating current circuit comprising a current transformer included in said load circuit and provided with a secondary winding included in said grid circuit to vary the frequency of the current generated by said apparatus in accordance with variations in its magnitude.

THEODOR FECKER.